United States Patent [19]
Grant et al.

[11] Patent Number: 6,129,277
[45] Date of Patent: Oct. 10, 2000

[54] CARD READER FOR TRANSMISSION OF DATA BY SOUND

[75] Inventors: Alan H. Grant, Chevy Chase, Md.; Richard J. Gambino, Stony Brook, N.Y.

[73] Assignee: Privicon, Inc., Chevy Chase, Md.

[21] Appl. No.: 09/127,812

[22] Filed: Aug. 3, 1998

[51] Int. Cl.[7] .................................................. G06K 5/00
[52] U.S. Cl. ......................................... 235/449; 379/357
[58] Field of Search .................................... 235/449, 380; 379/359, 361, 357

[56] References Cited

U.S. PATENT DOCUMENTS

| | | | |
|---|---|---|---|
| 4,197,987 | 4/1980 | Lazzari | 235/449 |
| 5,524,072 | 6/1996 | Labaton et al. | 380/24 |
| 5,539,819 | 7/1996 | Sonoyama et al. | 379/355 |
| 5,561,710 | 10/1996 | Helms | 379/93.27 |
| 5,636,271 | 6/1997 | Paterno et al. | 379/355 |
| 5,740,232 | 4/1998 | Pailles et al. | 379/93.02 |
| 5,764,742 | 6/1998 | Howard et al. | 379/114 |

*Primary Examiner*—Mark Tremblay
*Attorney, Agent, or Firm*—Jacobson, Price, Holman, & Stern, PLLC

[57] ABSTRACT

A portable card reader is designed to be carried in a wallet or purse. In a first embodiment, the card reader has an electromagnetic head that reads information from a magnetic strip of a card. In a second embodiment, information is read from the card by an array of Hall sensors. In both embodiments, the information read from the card is converted to a sequence of electronic bursts of predetermined frequency, preferably in the audible or ultrasound range. The sound signals are output by a speaker to the microphone of a telephone. The signal is then transmitted over the telephone lines to a remote receiver. The receiver then converts the sound bursts into signal pulses which can be read using the computer software of a conventional card reader.

19 Claims, 14 Drawing Sheets

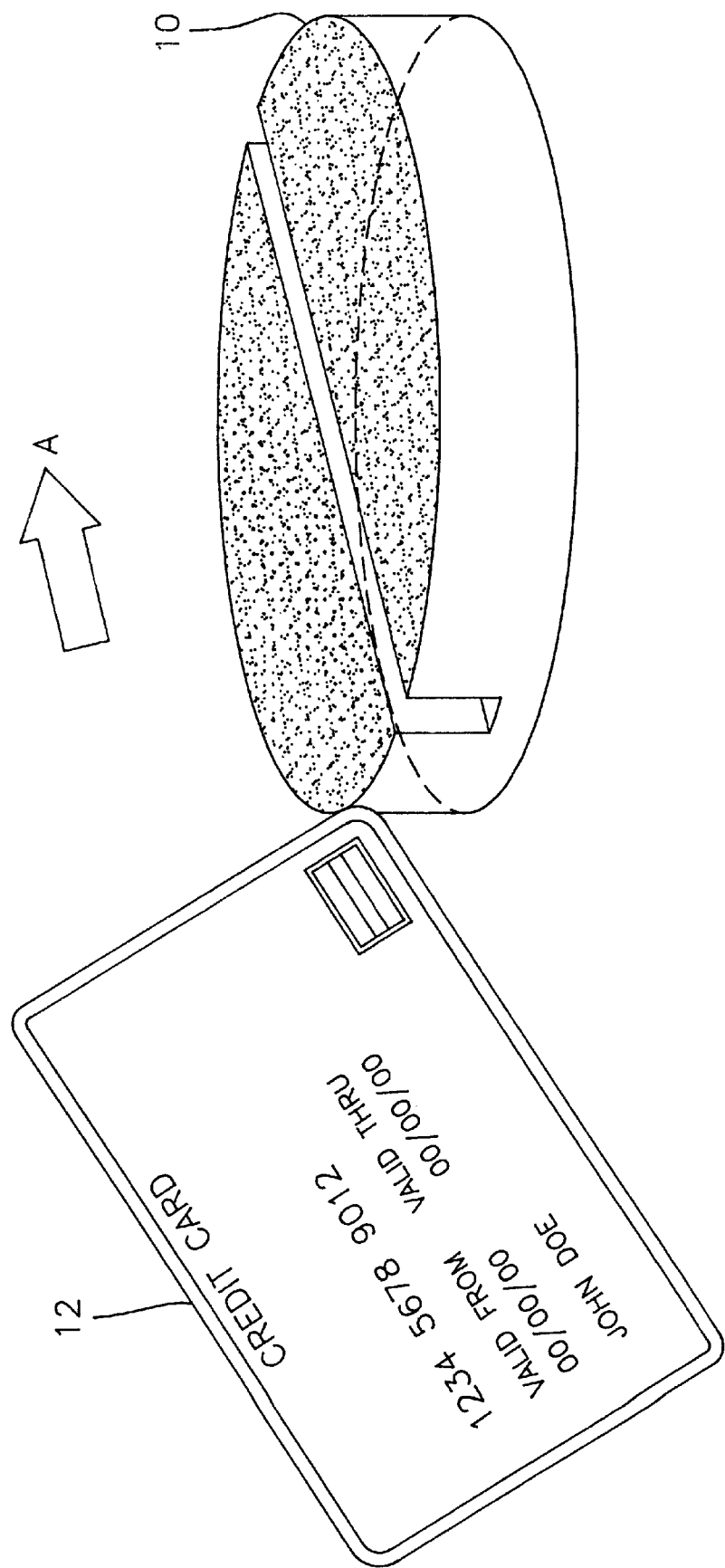

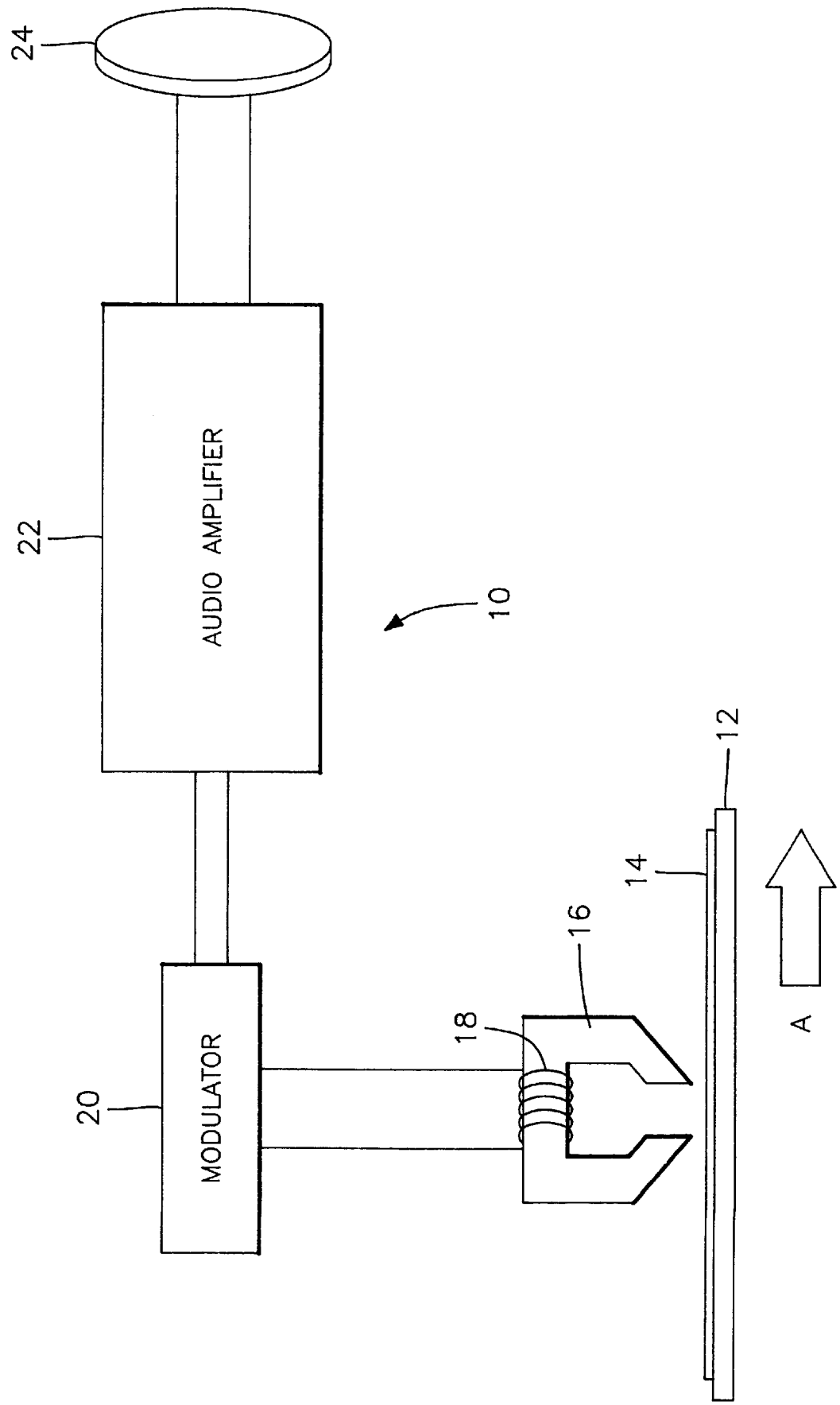

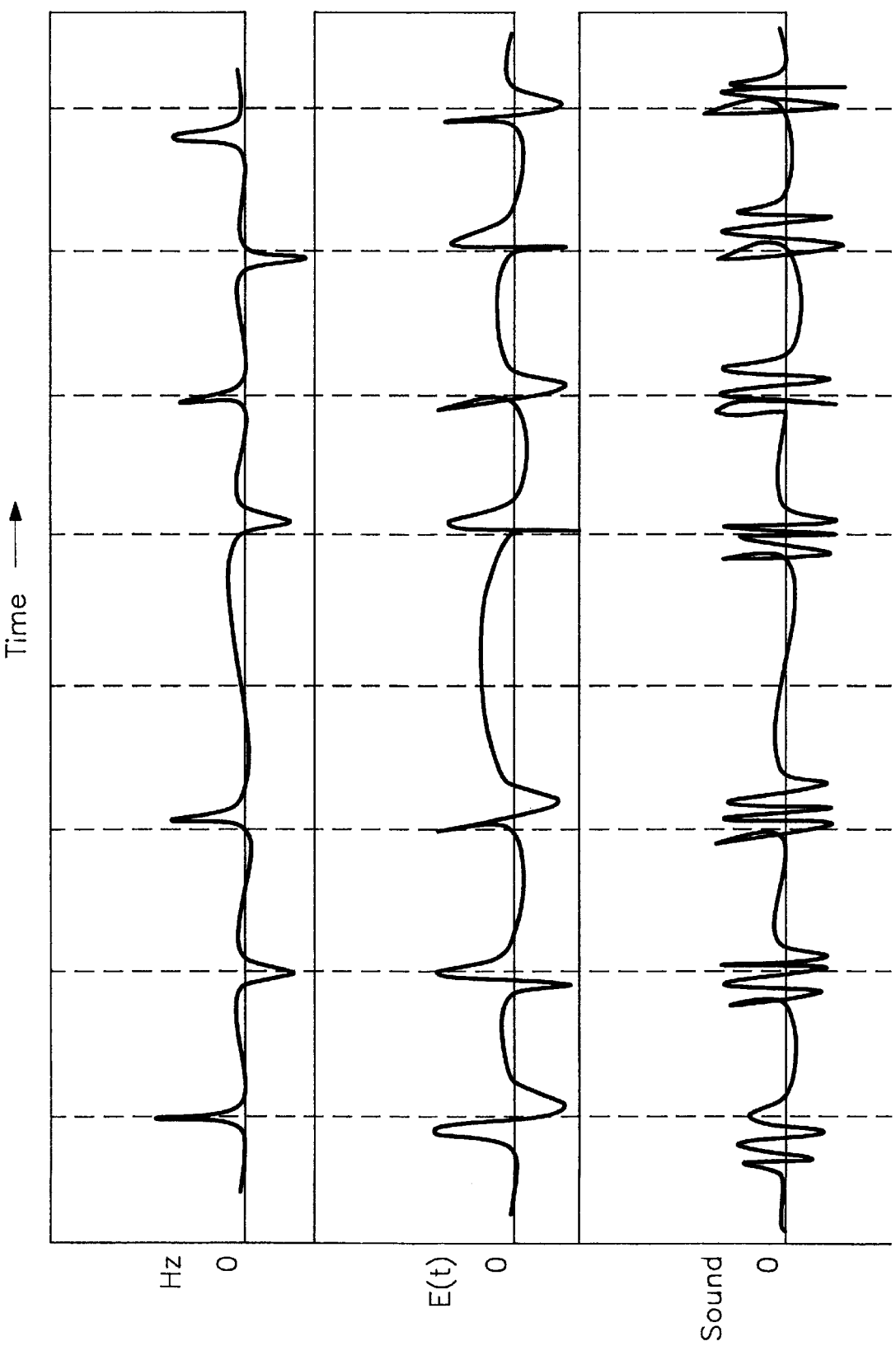

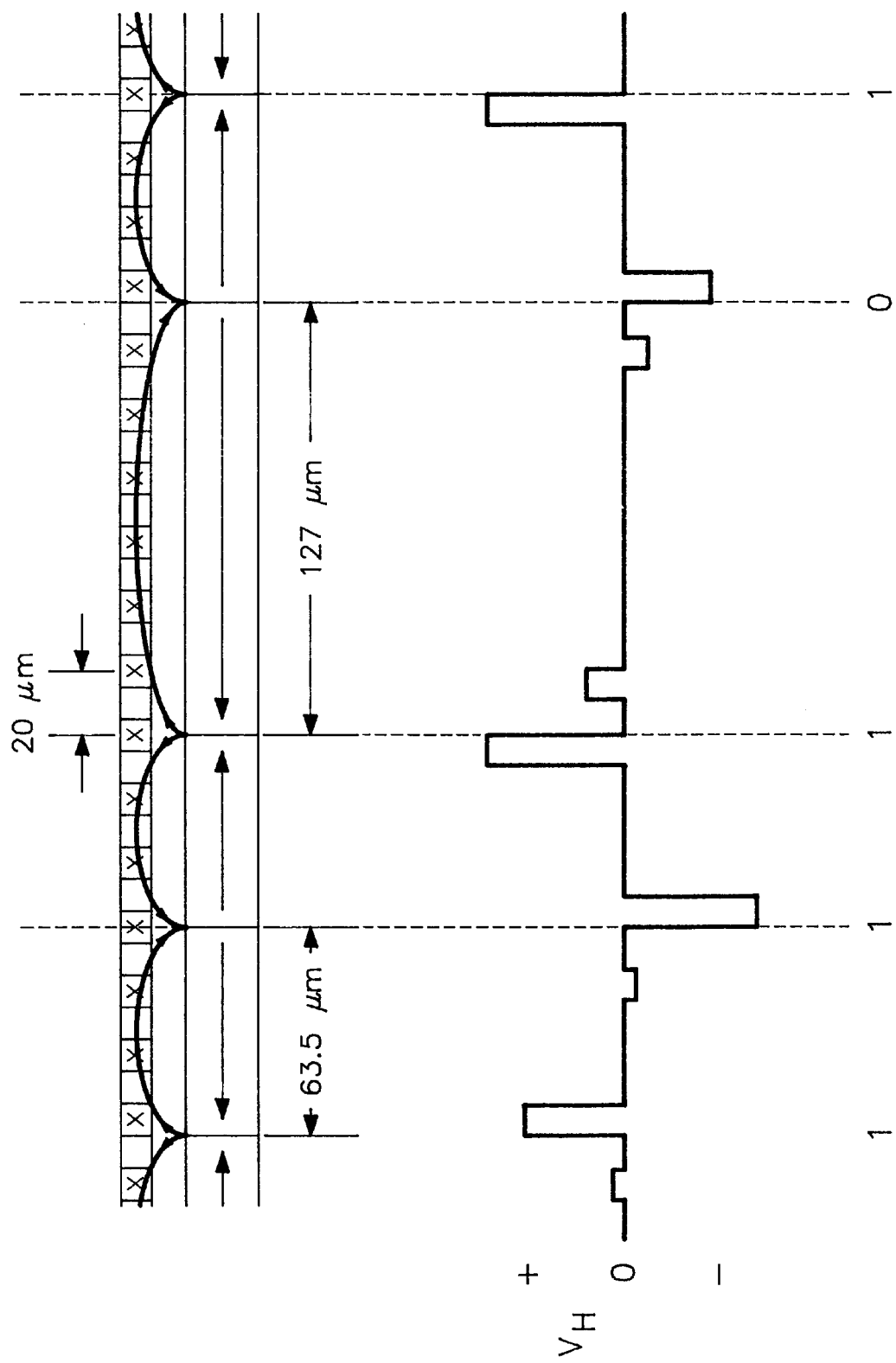

CARD READER FOR TRANSMISSION OF DATA BY SOUND

BACKGROUND OF THE INVENTION

1. Field of the Invention

The present invention relates to an apparatus for reading information stored on a magnetic strip card and transmitting the data to a remote location. More particularly, the present invention relates to a portable card reader, especially for use with a credit card, phone card, or the like, which transmits information read from the card over a telephone line or any other form of transmission of information.

2. Description of the Related Art

Plastic cards having electronically stored data are widely used to perform a large variety of tasks, from being used as conventional credit, telephone, or bank cards to use as a security key to operate a door lock. Other types of cards are gasoline credit cards, building, room and/or elevator security access cards, personnel cards, Automated Teller Machine (ATM) cards, debit cards and cash cards. For purposes of this application, however, these cards will be generically referenced as "authorization cards" or just "cards."

Authorization cards fall into three general categories: magnetic, electronic or "smart cards," and passive electronic cards. Confidential information, such as a unique account or card number, is typically stored on the card. In addition, the card number is printed on the face of the card, usually together with other security information such as the owner's name, the card's expiration date, and/or a Personal Identification Number (PIN).

In order to complete a given transaction at the point of sale, the card number and/or other confidential information is transmitted from the card to a card reader for recognition and authorization by running the card through the card reader.

However, when the card is located remote from the card reader, such as with transactions made by telephone, the confidential information cannot be swiped through the card reader. Hence, the card owner is forced to speak the card number, expiration date, user's name and/or other confidential information to the seller. The seller then enters the confidential information into the card reader or other authorization device in order to charge a purchased item or service.

Quite clearly, verbally giving confidential information over a telephone risks the security of the information. An unauthorized user may overhear the user speaking the confidential information, or a prior charge receipt may be used without authorization. The unauthorized user may then repeat the confidential information to another remote seller in order to fraudulently charge the user's account.

SUMMARY OF THE INVENTION

It is therefore a primary object of the present invention to eliminate the need for speaking confidential information stored on a card into a telephone.

It is a further object of the invention to provide means for reading data stored on an authorization card, including confidential information, and sending the data over a telephone to a remote card reader receiver.

It is a further object of the invention to provide a card that generates a sound that is converted to an electronic signal that can be transmitted over a telephone line and is not interfered with or eliminated by a filter.

It is a further object to provide a device that can transact or transmit information over a telephone line or to any system that receives information from a microphone or the like.

It is yet another object of the invention to provide a card reader that sends data over telephone lines that is portable and lightweight and can be carried in a pocket, wallet or purse. It is another object of the invention to provide a card reader that can operate in conjunction with existing magnetic cards.

In accordance with the above objects, the present invention is a portable card reader that is designed to be carried in a wallet or purse. In a first embodiment, the card reader has an electromagnetic head that reads information from a magnetic strip of a card. In a second embodiment, information is read from the card by an array of Hall sensors. In both embodiments, the information read from the card is converted to a sequence of sound bursts of predetermined frequency, preferably in the audible or ultrasound range. The sound signals are output by a speaker to the microphone of a telephone. The signal is then transmitted over the telephone lines to a remote receiver. The receiver then converts the sound bursts into signal pulses which can be read using the computer software of a conventional card reader.

BRIEF DESCRIPTION OF THE DRAWINGS

FIG. 1 is a perspective drawing of the card reader in accordance with the first embodiment of the invention.

FIG. 2 is a detailed diagram showing the components of the card reader.

FIG. 3 is a chart of the signals generated by the card reader.

FIG. 15 is a diagram of the transition, magnetic field lines and resulting pulses generated by the Hall sensor array.

DETAILED DESCRIPTION OF THE PREFERRED EMBODIMENTS

Figure 4A:
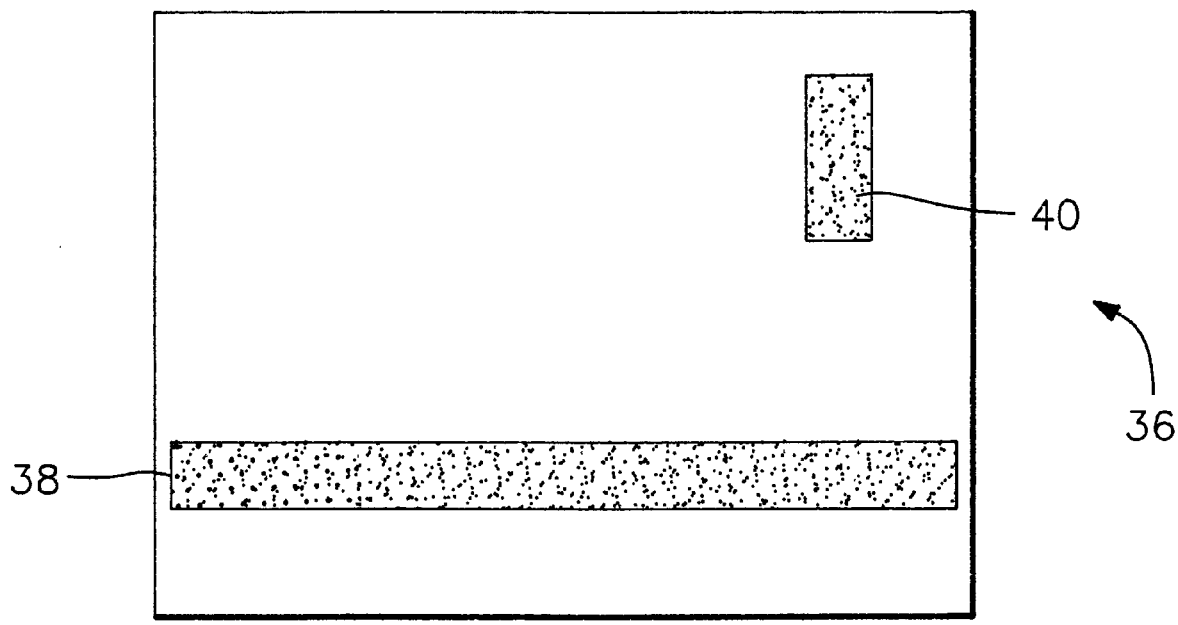
FIG. 4(a) is a bottom view of a magnetic card in accordance with a second embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Turning to the drawings, FIG. 1 shows a magnetic card reader 10 used with a conventional credit card 12 having a magnetic strip. The credit card 12 is passed or "swiped" through the reader 10 in the direction of the arrow A.

As shown in FIG. 2, the reader 10 generally comprises an inductive pickup head 16 having a coil 18, a modulator 20, amplifier 22 and speaker 24. As card 12 is swiped through the reader 10, the magnetic strip 14 passes the inductive pickup head 16. The inductive head 16 reads information from the magnetic strip 14 of the card 12 as it is passed through the slot of reader 10. Information is stored in the magnetic strip 14 by the use of magnetic transitions. A transition in the magnetic direction of the strip 14 represents binary 0's and 1's.

As the card 12 moves past the inductive read head 16, magnetic transitions representing binary data induce a small voltage in the coil 18 of the head 16. The voltage from the coil 18 stimulates the modulator 20 to produce a short burst of audio frequency signal. The audio frequency signal is amplified by audio amplifier 22 and sent to the speaker 24. The speaker 24 is preferably located on the bottom of the reader 10 (of FIG. 1), so that it may be held in close proximity to the microphone of a telephone, for instance. The audio frequency signal is then transmitted electronically over telephone lines to a remote receiver (not shown).

Preferably, the inductive magnetic head 16 is of the type used in conventional card readers. As the magnetic strip 14 of the card is moved past the inductive head 16, the vertical component of the magnetic field, $H_2$, of the strip 14 varies as a function of time, FIG. 3. A time varying electric field, E(t), is induced in the windings 18 of the inductive head 16, which in turn are connected to modulator 20. Each magnetic transition signal induces the modulator 20 to emit a short burst of a fixed frequency in the audio or ultrasound frequency range, which is shown in the bottom graph of FIG. 3.

Figure 10:
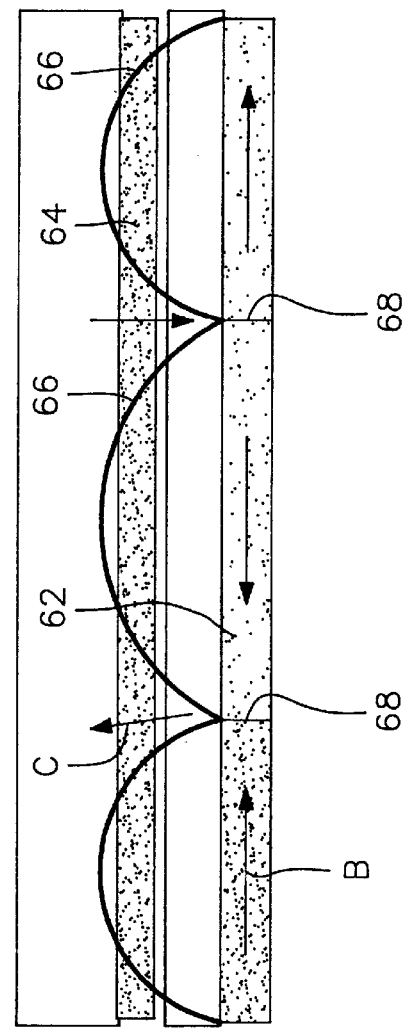
FIG. 10 is cut-away side view of the card of FIG. 9 showing magnetic field lines generated by the magnetic strip.

Magnetic transitions on card 12 are shown, for instance, in FIG. 10. In the first section of the strip 14, the magnetic flux flows toward the right of the page, as represented by arrow B. At the first transition point, the magnetic flux changes direction and flows toward the left side of the page. Accordingly, the magnetic field $H_2$ is directed outward, or positive, as shown by arrow C. The next transition results in an inward, or negative magnetic field.

The spacing of data bits on a magnetic card 12 is 5 mils (127 $\mu$m) between transitions for a binary zero and 2.5 mils (63.5 $\mu$m) for binary one. The transition points for each 2.5 mils are indicated in FIG. 3 by the vertical dashed lines. At the first transition point, the magnetic flux is reversed, resulting in a positive magnetic field. The next transition results in a negative magnetic field, and the magnetic field continues to flip flop until the fourth transition point.

At the fourth transition point, the magnetic flux does not reverse, which is represented by the absence of a magnetic field change. The remote receiver will recognize the time between the reversal of magnetic field to indicate either a binary one or zero. As the magnetic field Hz changes, so does the output of the inductive head 16 E(t) and the short bursts of sound produced by the speaker 24.

The frequency of the signal from the modulator 20 can be in the audio or ultrasound range provided the telephone receiver and lines have sufficient bandwidth to carry the high frequency. A preferred frequency in the audible range is about 1 kHz, though any suited audible frequency may be used, such as in the range of 400–4,000 Hz. A preferred frequency in the ultrasound range is about 40 kHz, though any suited ultrasound frequency may used, such as in the range from 30 to 40 kHz. Any suited signal may be used, such as a DTMF signal. However, a DTMF signal may be obstructed by the presence of a filter.

The short bursts from the modulator 20 at a fixed frequency are then amplified by amplifier 22. Preferably, the amplification is at about 100 mV, or 3 to 100 times amplification of the input signal. The amplified signal is then sent to loudspeaker 24, which emits a series of sound pulses corresponding to the magnetic transitions on the card 12. The sound reaches a microphone (not shown) of a telephone, for instance, which converts the sound pulses to electrical pulses that are sent electronically or telephonically to the remote receiver or to any system that is capable of receiving like signals.

The remote receiver is comprised of a filter that selectively passes the electrical pulses corresponding to the preselected frequency of the sound pulses. The short pulses are detected and converted to a series of electrical pulses similar to the original electrical pulses from the inductive head. The pulses are read and recorded using conventional software and computer interface that are used with a conventional magnetic card reader.

In a telephone credit card transaction with the card reader 10 of this invention, the card number, expiration data and card holder's name are preferably sent over the telephone line by the card holder. The information can be verified by the bank that issued the credit card and the approval sent to the merchant. This method allows the card holder to make remote transactions without exposing the card number or other information to the merchant. Furthermore, the information cannot be overheard by third parties that might otherwise be in a position to hear the conversation between the card holder and the merchant. This provides better security for the information.

By the present invention, a computer microphone calling card or a telephone calling card would permit use of a conventional telephone without dialing code numbers which can be overheard and remembered by a nearby observer. Moreover, it is not necessary for the account number or expiration data to be printed on the card at all. Thus, lost and stolen cards could not be used by an unauthorized user other than by a direct transaction with a merchant. In this regard, it is preferred that the user keep the card separate from the card reader.

However, the invention has particular advantages with cards requiring the entry of a PIN number to activate access to confidential information. The card reader may also be provided with a separate authorization code that must be entered by the user to read the card and transmit the sound signals.

The invention may also be used, for instance, for parking garage and door access control. The information from a card can be transmitted from a loudspeaker of the card reader to a microphone location on the door.

FIGS. 4–7 show an alternative embodiment of the invention. In this second embodiment, the card reader 30, FIG. 4(b), has two contact pads 32 and a Hall sensor array 34. The magnetic card 36, FIG. 4(a), on the other hand, has a magnetic strip 38 and a conductor bar 40. The present embodiment is much more compact than the first embodiment shown in FIGS. 1–3. Accordingly, the present embodiment is more portable and can be easily carried in a wallet or purse. The first embodiment is somewhat less portable, and perhaps better suited for use at a person's home or office or for permanent connection to a public telephone or the like.

Hall sensor arrays have been used, for instance in U.S. Pat. No. 5,543,988 to Brady et al. which is herein incorporated by reference, to sense magnetic fields. The Hall sensor array 34 of the present invention is preferably fabricated by etching a thin film of a suitable material with a large Hall effect using photo lithographic patterning.

As noted above, the spacing of data bits on a magnetic card 36 is 5 mils (127 $\mu$m) between transitions for a binary zero and 2.5 mils (63.5 $\mu$m) for binary one. Preferably then, the individual Hall sensors 42 in the array 34 are located on 10 to 20 $\mu$m centers to provide sufficient resolution in transmission spacing to distinguish 1's and 0's.

Figure 6:
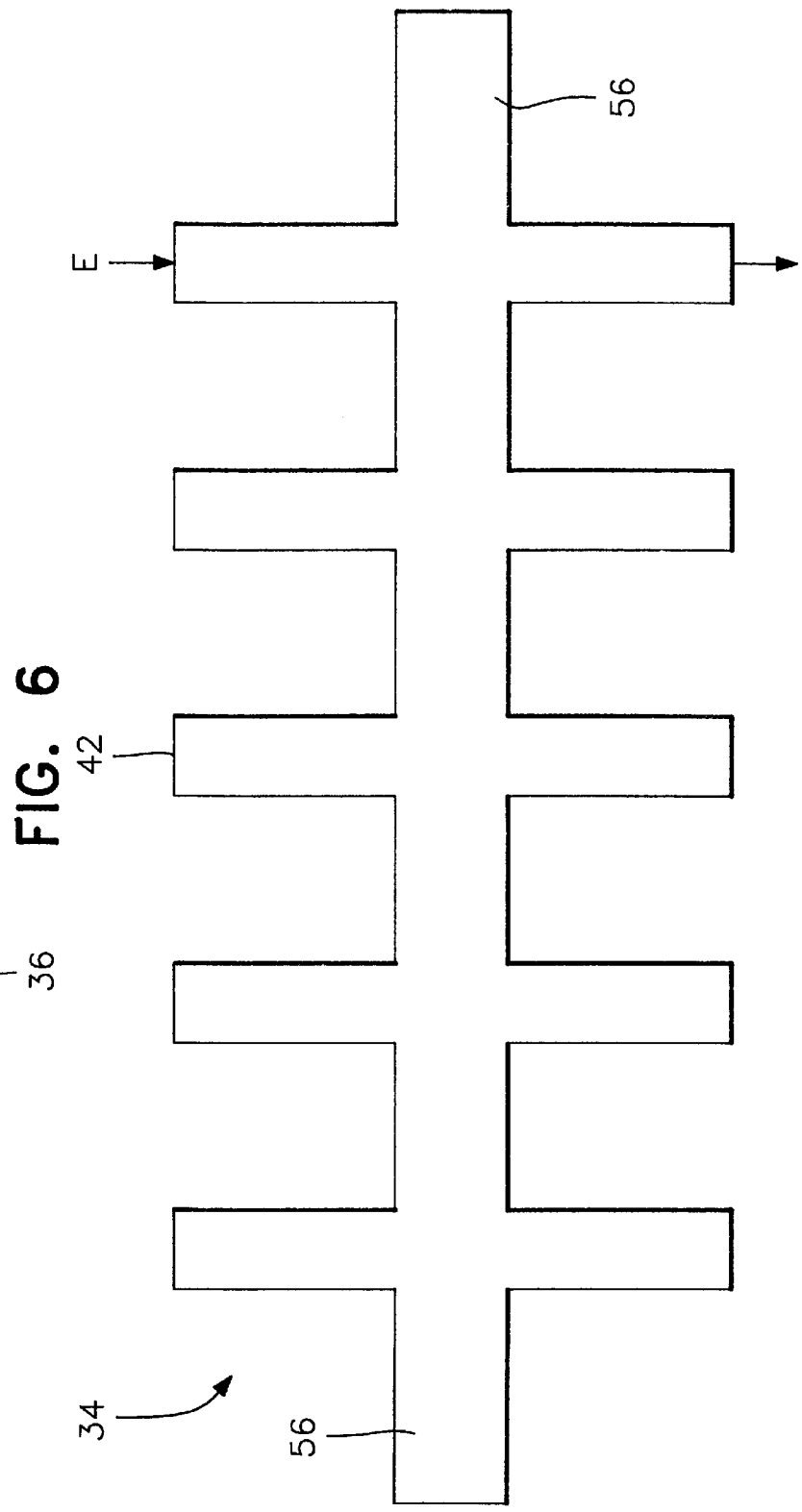
FIG. 6 shows the Hall sensor array for the magnetic card reader of FIG. 4(b).

As best shown in FIG. 6, the sensors 42 are equally spaced and perpendicular to the central connecting bar. The Hall sensors 42 are each connected to a common voltage line and one of the sensors 42 is cross activated by transmitting a current through it, as indicated by arrow E. The sensors 42 are each approximately 10 $\mu$m wide.

Figure 5:
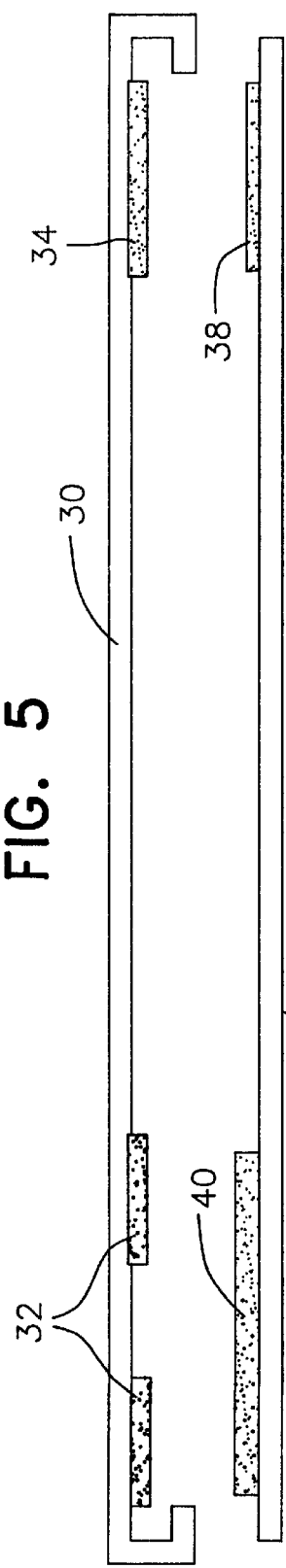
FIG. 5 is a side view of the magnetic card of FIG. 4(a), together with the card reader of FIG. 4(b).

FIG. 5 shows the relationship between the contact pads 32 and conductor bar 40, as well as between the Hall sensor array 34 and the magnetic strip 38. The conductor bar 40 and contact pads 32 are located so that they align with each other. In this position, the Hall sensor array 34 is also aligned with the magnetic strip 38.

When the card reader 30 and card 36 are pressed together with the proper orientation, the conductor bar 40 is brought into contact with the two contact pads 32. The conductor bar 40 completes a circuit in the reader 30 through the contact pads 32, turning on the power supply of the reader 30. Current is then supplied to the Hall sensor array 34 and amplifier 48. Hence, the conductor bar 40 not only operates to align the magnetic strip 38 with the Hall sensor array 34, but to activate the reader 30 to generate the sound signal.

Thus, in the preferred embodiment, it is not necessary to maintain power to the electrical circuit at all times. Rather, a "wake-up" circuit is activated that turns on the power for sufficient time (100 msec to 1 sec) to send the data stream repeatedly. The reader 30 may then automatically be powered down, or may enter a sleep state. When the card 36 and reader 30 are separated, the circuit is broken by the loss of contact between conductor bar 40 and contact pads 32, and the reader 30 is turned off.

Figure 4B:
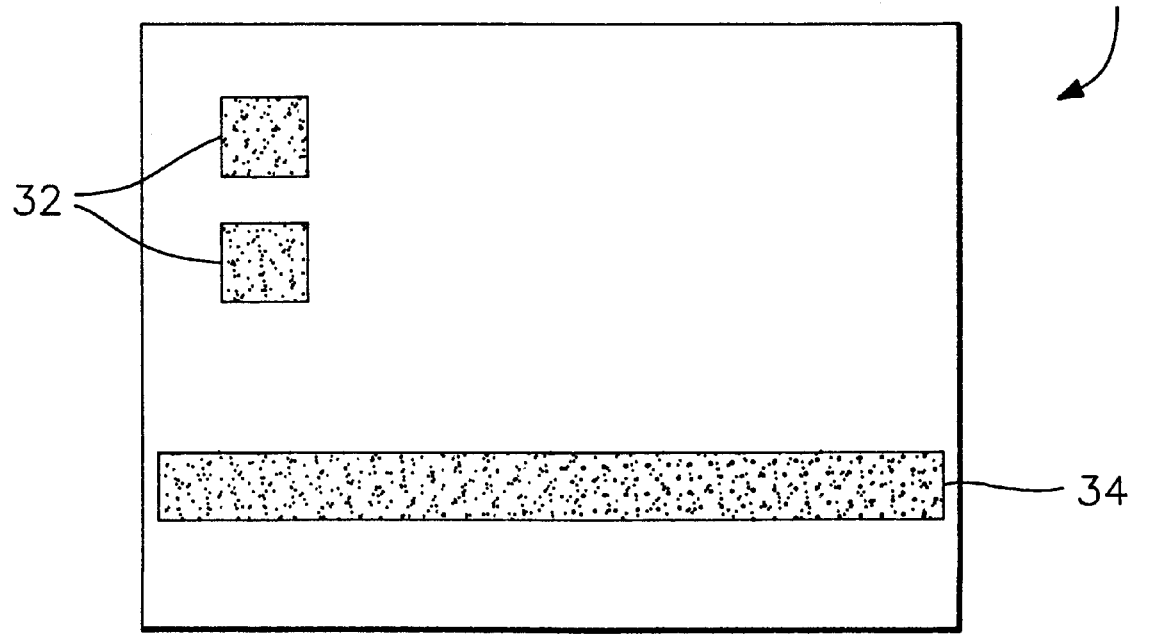
FIG. 4(b) is a top view of a magnetic card reader used in connection with the second embodiment of the invention.
Figure 4C:
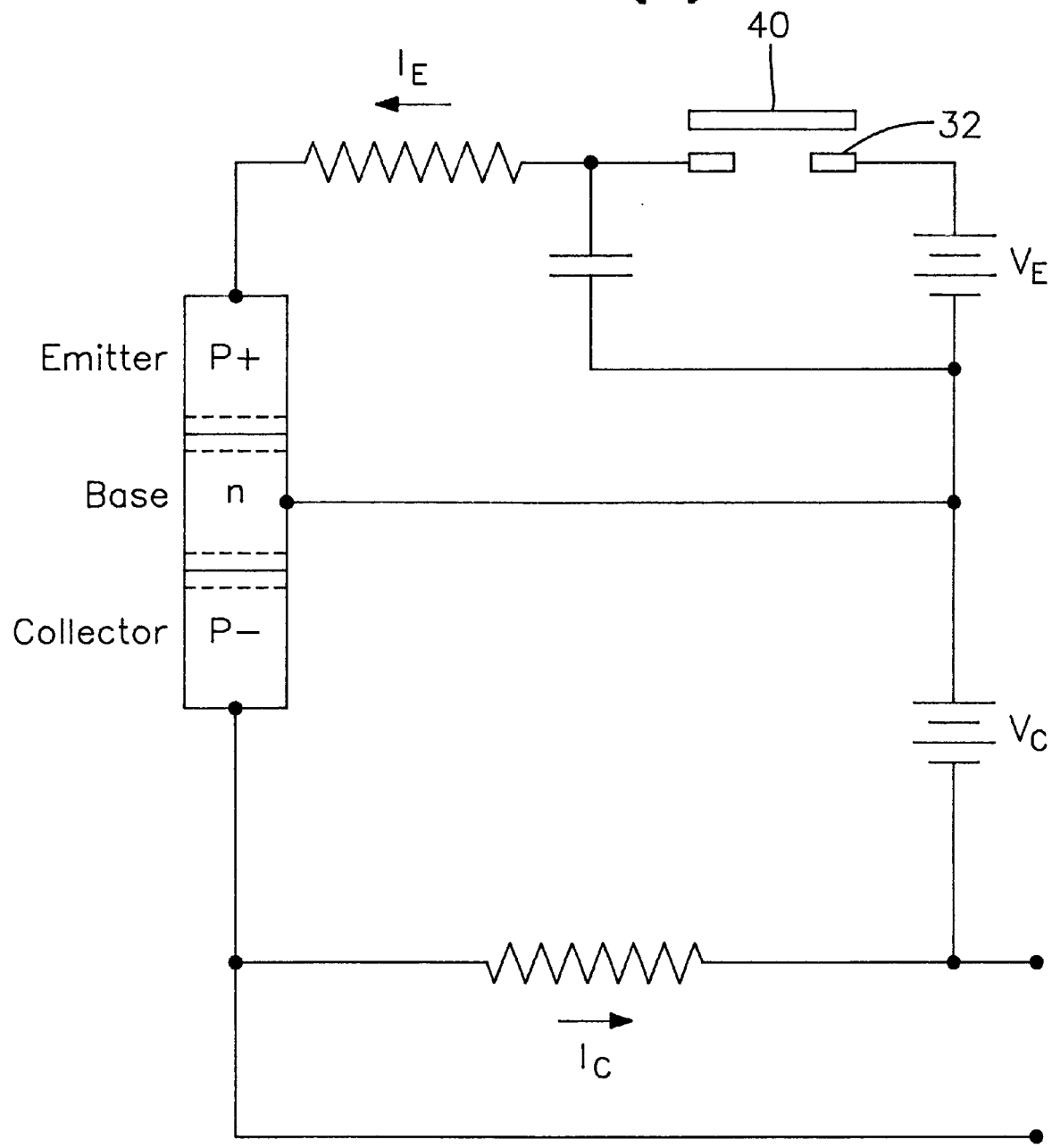
FIG. 4(c) is a circuit diagram showing the electronic operation of the card reader.

Turning to FIG. 4(c), the circuit diagram shows the "power up" circuit, and the relationship between the conductor bar 40 and contact pads 32. As conductor bar 40 comes into contact with contact pads 32, the circuit is activated. The battery $V_E$ connects to the circuit to charge the capacitor and induce a current $I_E$ to operate the transistor. Accordingly, the transistor acts as a switch that connects the second battery $V_c$ that in turn induces current $I_c$ and operates the device.

In the preferred embodiment of FIG. 5, the sides of the reader 30 have a C-shape defining elongated slots. The card 36 may then easily be aligned with the reader 30 by sliding the card 36 into the slots. The C-shaped configuration also facilitates storing the card 36 in the reader 30 during periods of non-use. In order to de-activate the reader 30 while not in use, the card 36 need simply be turned over or be inserted in a reverse direction so that the conductor bar 40 does not contact the contact pads 32.

In an alternative embodiment, a mechanical switch may be used instead of the conductor bar 40 and contact pads 32. The switch may be placed on the reader 30 and depressed when the card 36 is properly aligned with the reader 30. The switch may be provided, for instance, within one or both of the slots. The switch would then operate to activate the reader to read the information stored on the magnetic strip 38 and generate a sound signal. The reader 30 may power down automatically after the information is transmitted, or power down upon removal of the card 36. Still yet, a notch may be placed in the edge of the card so that the reader is only activated when the switch is not aligned with the notch.

The conductor bar 40 is preferably in the form of a thin film of an electrical conductor, such as a metal film on a polymer foil substrate to provide a flexible electrically conductive strip. Alternatively, a metal foil may be used. The bar 40 is further provided with an adhesive backing. Thus, any magnetic card 36 can be adapted to be used with the card reader 30 simply by placing the conductive strip 40 at the proper position on the card. In new cards, a rectangular bar of metal foil can be molded into the back of the card in the appropriate position.

Figure 7:
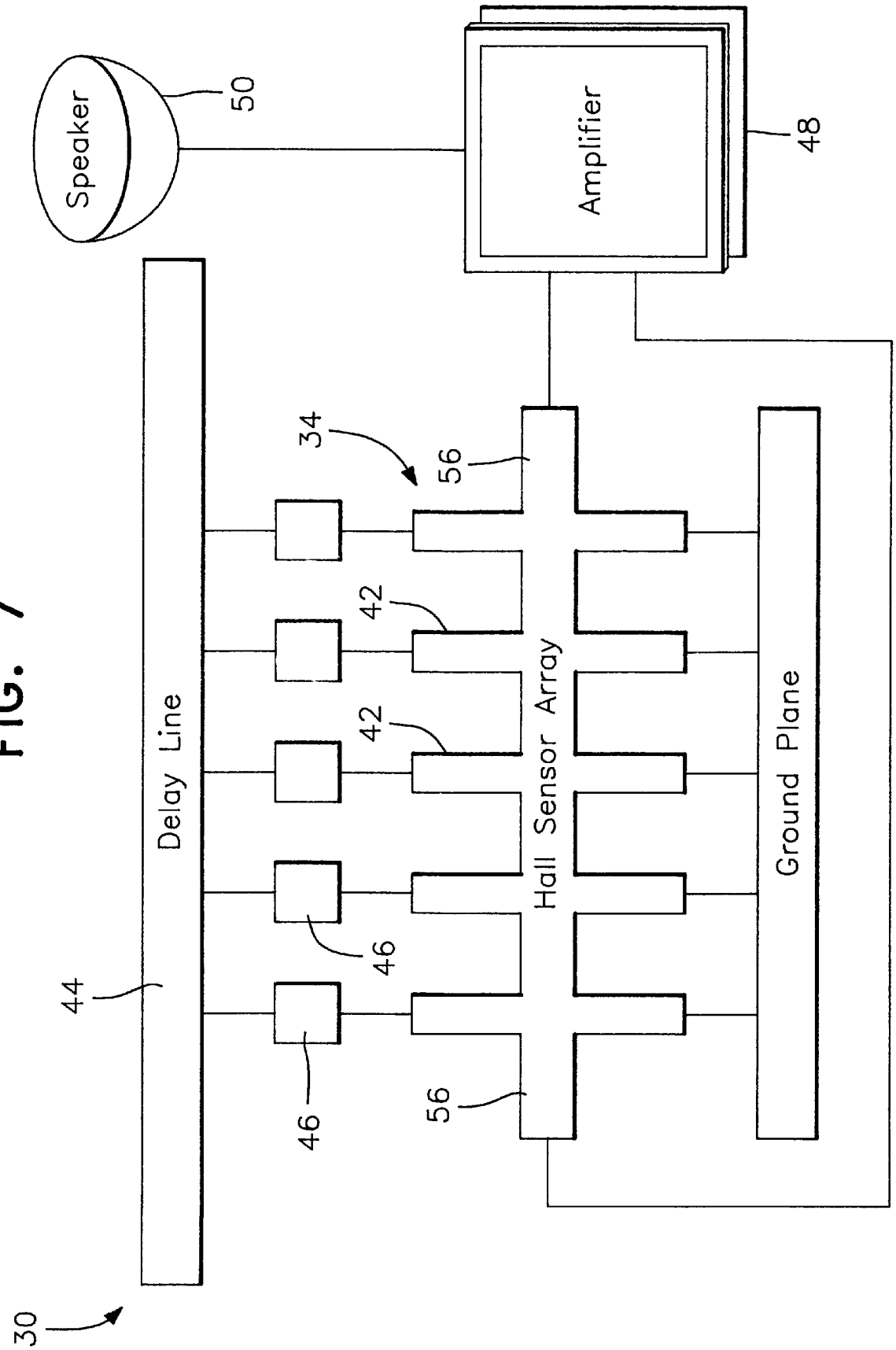
FIG. 7 is a block diagram of the magnetic card reader.

The Hall sensor array 34 requires a current in order to produce an electric field $E_z$ perpendicular to the plane defined by the direction of current flow and the magnetic field direction. As shown in FIG. 7, a delay line 44 is used to control the flow of current to the individual Hall sensors 42 in the array 34 so the sensors 42 are activated in a sequential manner. The output of the array 34 thus has a time dependence which simulates the time dependent signal produced by a conventional inductive head card reader, such as shown in the embodiment of FIGS. 1–2.

The delay line 44 is used to control current sources 46 so that the Hall sensors 42 in the array 34 are activated sequentially. Thus the Hall voltage at the ends of the sensor array 34 has a time dependence similar to that of a conventional inductive head magnetic card reader. The delay line 44 can be activated repeatedly so the information content of the card is read many times for error correction.

The delay line 44 preferably comprises parallel shift registers that are clocked by a common source. Each Hall sensor cross is associated with one shift register to operate as a first-in-first-out (FIFO) memory. Accordingly, the data stream provides a voltage pulse at Gate 1 at $t_1$, at Gate 2 at $t_2$, etc., in order to provide a current pulse through Hall cross 1 at $t_1$, Hall cross 2 at $t_2$, and so forth.

Current sources 46 preferably comprise monolithic MOS switches that are used as gates. The base is connected to the delay control line, and the remaining ends are connected to the power supply and Hall sensor array.

The signal output from the Hall sensor array 34 can thus be received and processed by the same hardware and software as is used in existing card readers that are hard wired to telephone lines. The output voltage from the Hall sensor array 34 is amplified by amplifier 48 and transmitted as a sound signal by a loudspeaker 50 or similar transducer of electrical signals to sound waves.

The loudspeaker 50 is preferably located in proximity to the mouth piece of a telephone to send the confidential information to a remote location. In the embodiment of FIG. 4(b), the speaker 50 would be located on the reverse side of the reader 30 so as to be readily accessible to the telephone microphone.

Because the Hall array is a thin film, the reader 30 is approximately the size and shape of a credit card. A thin format, thin film type battery (not shown) is used to provide the current for the Hall sensor array 34, delay line 44, amplifier 48 and the loudspeaker 50.

The Hall sensors are preferably made of a semiconductor, such as silicon, germanium or indium antimonide. However, the Hall coefficient of semiconductors is small unless they are high quality signal crystals. Ferromagnetic metals in the form of thin films with amorphous structure have been shown to have a large Hall coefficient at magnetic saturation. The amorphous magnetic films can be easily deposited onto polymer substrates by vacuum evaporation, sputtering or electroless or electrodeposition.

The Hall sensors of amorphous magnetic material produce a large Hall voltage in a small magnetic field if they have a perpendicular easy axis magnetic anisotropy. Such films saturate in a small magnetic field perpendicular to the plane of the film. Magnetic anisotropy can be induced in amorphous magnetic materials during the deposition process. The deposited films are patterned into a linear array of Hall crosses by lithographic processing. Photolithography is commonly practiced in the electronics industry to pattern thin films of metals used for conductors on semiconductor and magnetic devices.

The information stored on the magnetic strip 38 consists of a pattern of magnetized regions 25 $\mu$m wide by 3 mm long arranged perpendicular to the long axis of the strip. The spacing between these magnetized regions is 127 $\mu$m for binary zero and 63.5 $\mu$m for binary one. The Hall sensor array 34, therefore, places a Hall sensor 42, which is about 10 $\mu$m wide, at 20 $\mu$m spacing in order to pick up the field lines 66 (FIG. 10) generated from the transitions 68 on the magnetic strip 38. Hence, a total of 4000 Hall crosses 42 are needed in the linear array 34 to cover the 80 mm length magnetic strip 38 of a typical magnetic card 36.

The Hall sensors 42 respond to the vertical or Z-component of the magnetic field of a magnetic bit, as does a conventional inductive pickup head in a magnetic card reader. As current passes through the Hall sensor 42, the current is affected by the field lines 66 generated by transitions 68. If a transition 68 occurs, a voltage will result on voltage lead lines 56.

In an alternative embodiment, an array of magnetoresistive sensors can be used in place of the Hall sensors. However, the magnetoresistive sensors respond most efficiently to the in-plane or X and Y components of the magnetic field of a magnetic bit. Hence, the decoding software for recognizing "1's" and "0's" would have to be modified to detect magnetic transition from the X–Y field changes. In order to sense the Z component, the magnetoresistive sensor would have to be oriented with the plane of the thin film sensor perpendicular to the surface of the magnetic strip. A sensor array of this type cannot be made by a simple lithographic patterning and etching process.

Figure 8:
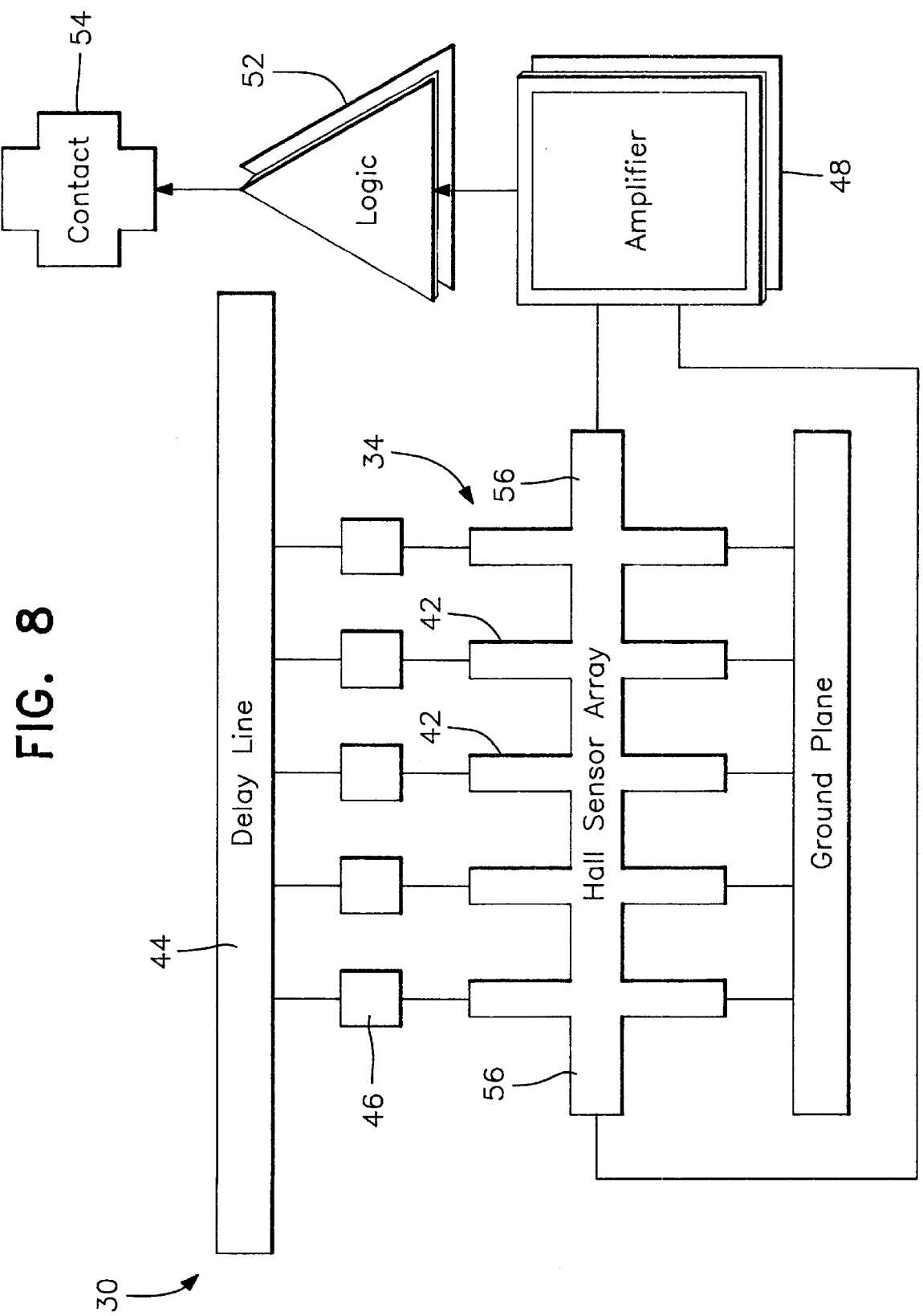
FIG. 8 shows a card reader for reading information from both magnetic and smart cards in accordance with a third embodiment of the invention.

Turning to FIG. 8, an alternative embodiment is shown, wherein the data is sent as a sequence of electrical pulses to emulate a smart card. The information obtained from the magnetic strip 38 of the magnetic card 36 is put into a format which can be processed by an electronic smart card reader. The card reader 30 generally comprises a Hall sensor array 34, delay line 44, current control sources 46, amplifier 48, logic 52 and contact 54.

The control of the Hall sensor array 34 is the same as for FIG. 7. Now, however, the amplified signal is processed by a logic circuit 52 that outputs a signal in the format used by an electronic smart card at contact point 54. The smart card reader (not shown) interfaces with reader 30 at contact 54. Hence, the present embodiment converts information read from a magnetic card to a smart card data format. This magnetic card to smart card data converter makes it possible for holders of magnetic cards to carry out transactions on smart card reader devices.

In addition, the features of both FIGS. 7 and 8 may be combined into a single reader having a speaker 50 (FIG. 7), as well as logic circuit 52 and contact 54 (FIG. 8). This combined reader is then able to output information read from a magnetic card in both sound as well as smart card format. The amplifier 48 would simply be connected to both the speaker 50 and to the logic circuit 52.

Figure 9:
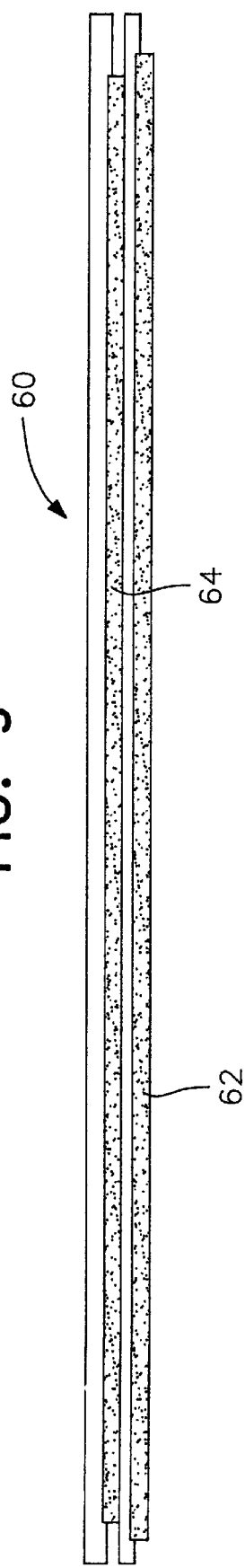
FIG. 9 is a cut-away side view of a card having both a Hall sensor array and a magnetic strip in accordance with a fourth embodiment of the invention.

FIGS. 9 and 10 show another embodiment of the invention consisting of a Hall array card reader and a magnetic data storage card combined into a single card/reader 60. The card/reader 60 has both a magnetic strip 62 and a Hall sensor film 64. The card 60 is provided with an amplifier and speaker device for transmission of data by sound as well as "smart card" type electronic data readout. The combined card/reader 60 provides transmission of data by sound as well as compatibility with a smart card electronic reader.

The card 60 is constructed by depositing a Hall sensor array 64 on a polymer substrate that is laminated to the back of the polymer substrate supporting the magnetic strip 62. FIG. 10 shows the magnetic field 66 distribution near a magnetic bit or transition 68. The vertical component of the magnetic field 66 passes through the polymer and is sensed by the Hall sensors in the array 64.

FIG. 15 is a more detailed diagram of the relationship between the individual Hall crosses (marked with an X), the magnetic data bits or transitions (represented by the arrows) and the field lines. As depicted by the drawing, the Hall sensors are only sensitive to the up or down field components. The spacing of the Hall crosses (20 $\mu$m) is smaller than the spacing between the transitions (63.5 $\mu$m for ones and 127 $\mu$m for zeros). The small $V_H$ pulses are due to whether the Hall crosses are directly aligned with the transition points, or slightly offset.

The thin film battery, delay line circuitry and semiconductor integrated circuit (not shown) are all laminated into the card 60. When the card 60 functions as a smart card, the circuitry can be powered from the electronic connection between the card 60 and the electronic reader. A small contact switch may be used to activate the battery for transmission of data by sound.

The card 60 of the present embodiment can also function as a magnetic smart card. A magnetic inductive write head is provided at the card reader. After an electronic transaction is completed, updated information can be written on the magnetic strip 62 by activating the write head. For example, an account balance or the remaining value of a money card can be entered as the card is removed from the smart card reader. The recorded information is nonvolatile, as is all magnetic storage media, so the information can always be retrieved either magnetically or electronically.

Figure 11:
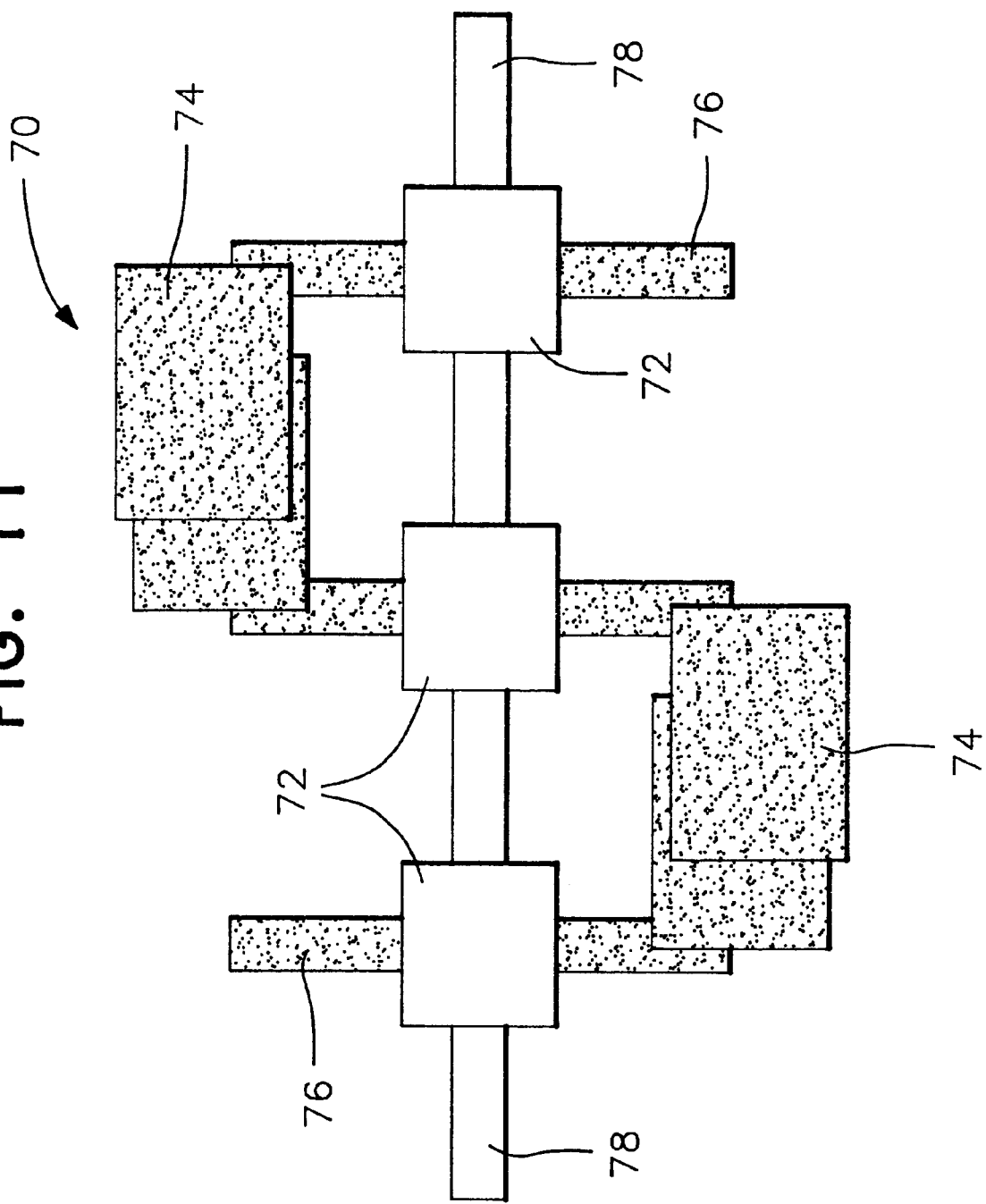
FIG. 11 is an alternative embodiment of the Hall sensor array having an RC delay circuit.

FIG. 11 shows an alternative embodiment of the Hall sensor array 70 incorporating an RC delay circuit. The array 70 has Hall sensors 72, capacitors 74, current lead lines 76 and voltage lead lines 78. The array 70 is configured to maximize the current passing through the Hall sensor 72 from the top current lead line 76 to the bottom lead line 76, while at the same time allowing voltage to be recognized at voltage lead lines 78.

In the conventional Hall sensor array, there is a parasitic flow of current in the X-direction as current passes through the current lead lines 76 to the Hall sensor 72. The present invention reduces the loss of current by coating the current leads 76 with a better conductor material than the voltage lead lines 78 and the lines connecting the Hall sensors 72.

The better conductor material enhances the flow of current in the Y-direction. Thus, current flow is guided from the top current lead 76, through the Hall sensor, to the bottom current lead 76.

Figure 12:
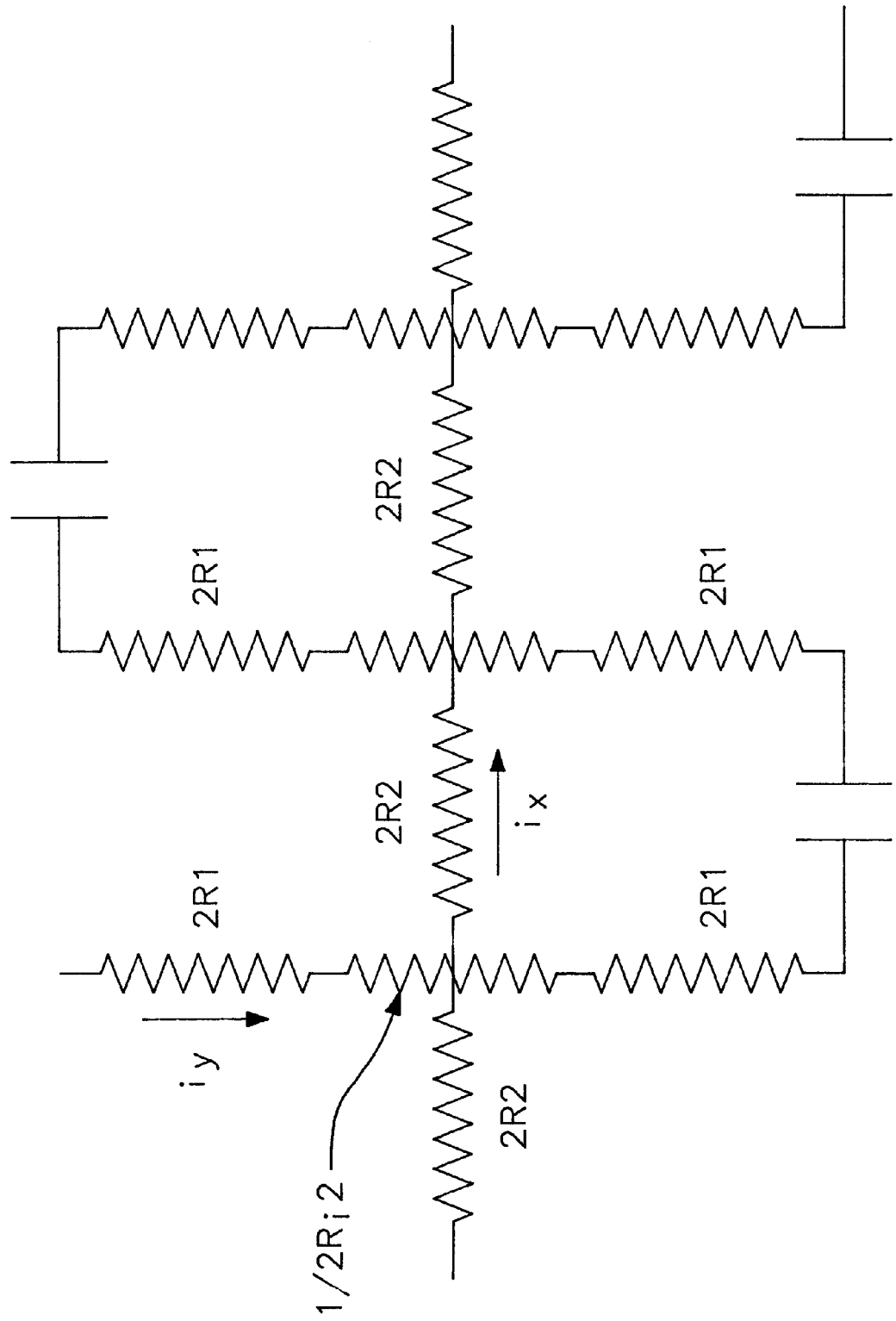
FIG. 12 is a circuit diagram for the Hall sensor array of FIG. 11.

A preferred circuit diagram is shown in FIG. 12, where ½ R2 represents the Hall sensor 72. The value for R2 is approximately 100 times that of R1, so that the current in the Y-direction, across the sensor 72, i, is much greater than the current in the X-direction, $i_x$. The Hall sensor 72 preferably consists of an amorphous alloy film: Co 85 atomic%, Gd 15 atomic%. The film thickness is about 0.1 $\mu$m having an electrical resistivity of about 100 $\mu\Omega$/cm. The enhanced conductive material is preferably a crystalline Cu film having a thickness of 1.0 $\mu$m and a resistivity of 10 $\mu\Omega$/cm.

Figure 13:
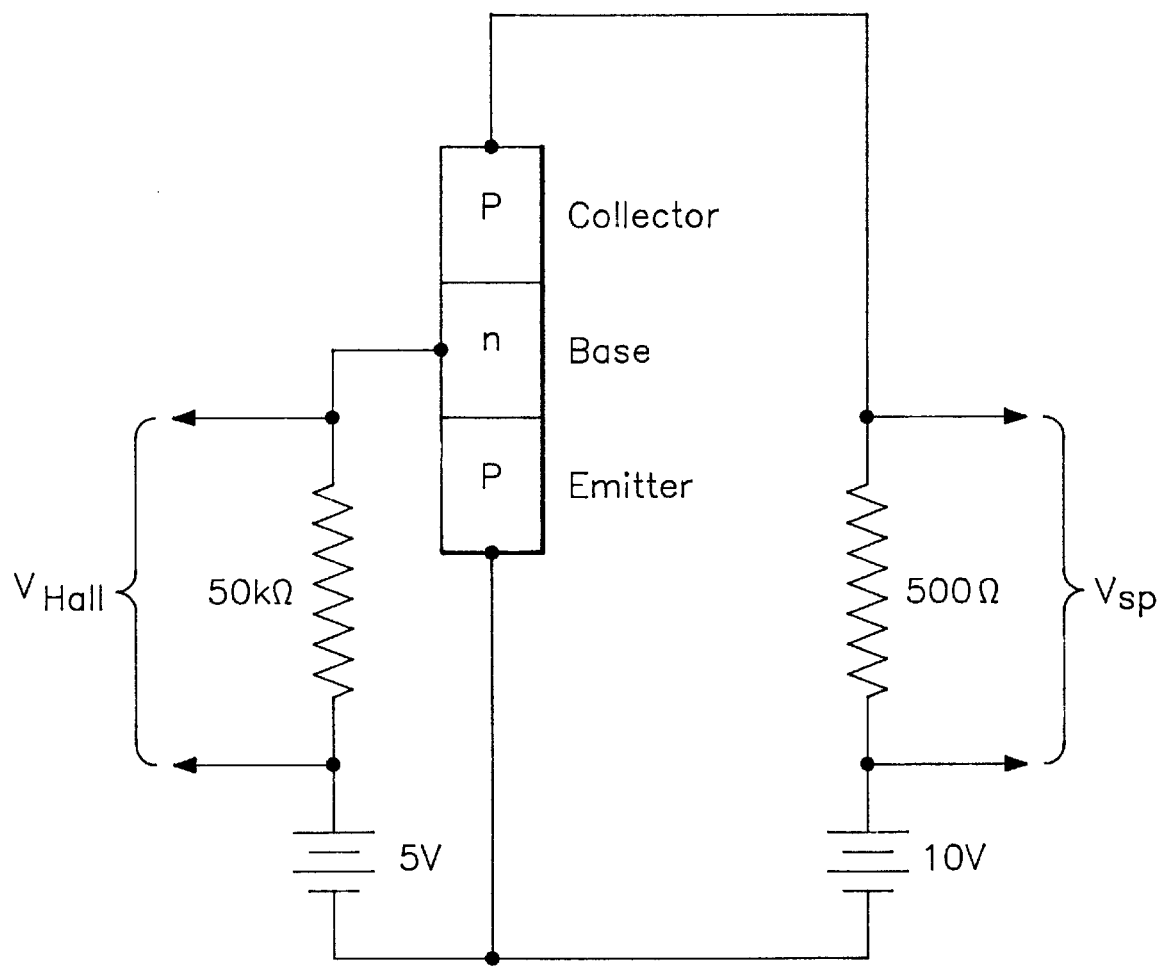
FIG. 13 is a circuit diagram for the amplifier.

FIG. 13 shows the preferred embodiment of the amplifier 48 used in the embodiments of FIGS. 7 and 8 in greater detail. The amplifier 48 comprises a common emitter circuit, in which $V_{Hall}$ represents the voltage to the Hall sensor array and $V_{sp}$ represents the voltage to the speaker. The Hall voltage $V_H$, when added to the bias voltage from the 5V battery, causes the narrow base region (B) to conduct holes. The current flowing through the 500 $\Omega$ resistor causes a voltage drop across the resistor which drives the speaker. The Hall voltage signal is amplified because a small change in base-emitter voltage (B–E) near the threshold causes a large change in current in the emitter-collector (E–C) circuit.

Figure 14:
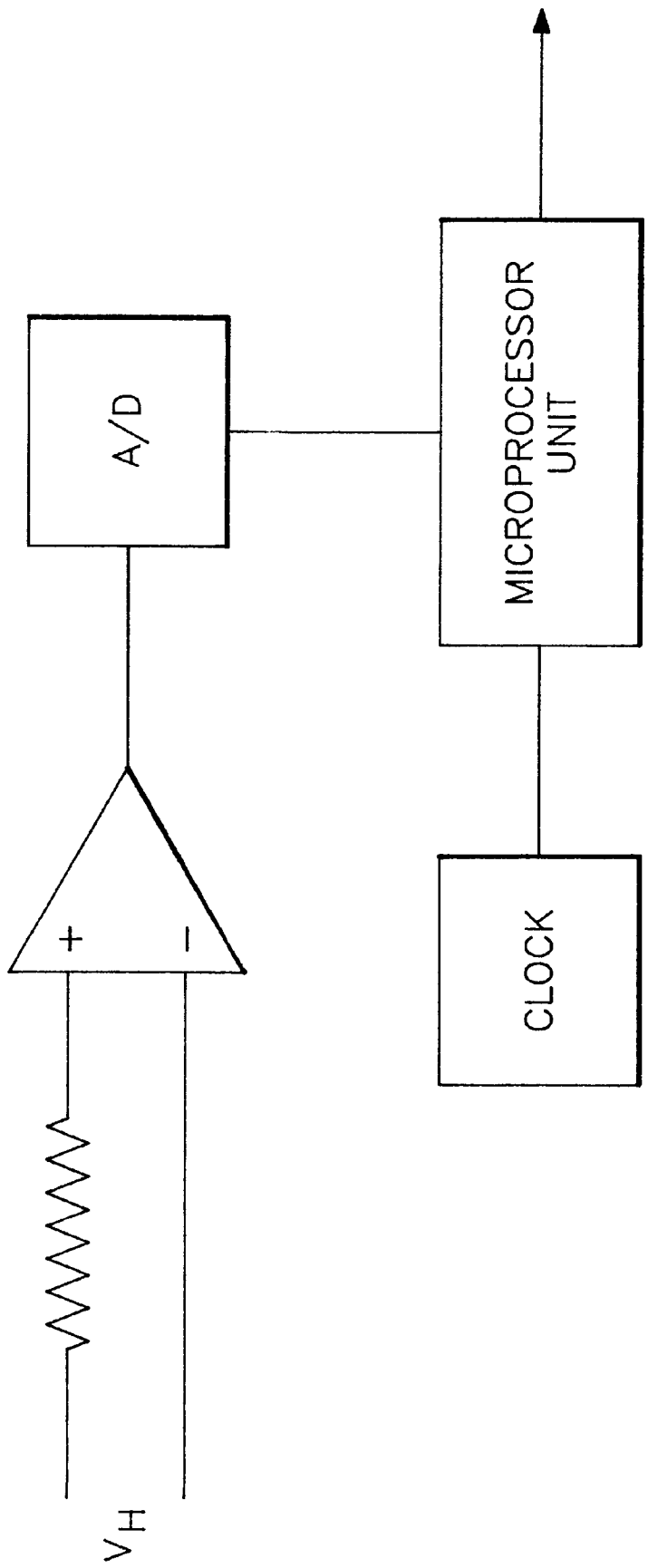
FIG. 14 is a circuit diagram for the logic circuit.

FIG. 14 represents the preferred embodiment for the logic circuit 52 of FIG. 8. The logic is a microprocessor unit, system clock, analog-to-digital (A/D) converter and a comparator circuit. The output of the microprocessor is in the form of digital data having conventional format for smart cards.

The foregoing descriptions and drawings should be considered as illustrative only of the principles of the invention. The invention may be configured in a variety of manners and is not limited by the dimensions or features of the preferred embodiment. Numerous applications of the present invention will readily occur to those skilled in the art. For example, the card reader may be used to generate sound signals corresponding to information read from an electronic smart card. In addition, the reader may be solar powered. Therefore, it is not desired to limit the invention to the specific examples disclosed or the exact construction and operation shown and described. Rather, all suitable modifications and equivalents may be resorted to, falling within the scope of the invention.

We claim:

1. A device for reading information stored on a magnetic card having a magnetic strip and a conductor bar, comprising:
   a card reader having a sensor array and two contact pads positioned such that, when the magnetic card is positioned properly in the card reader, the contact pads are aligned with the conductor bar and the sensor array is aligned with the magnetic strip, and such that when the card is placed into physical contact with the reader the contact pads contact the conductor bar to activate the reader, providing power to the sensor array for reading the information stored on the magnetic strip and outputting a read signal;
   a modulator connected to said sensor array for modulating the read signal to obtain a modulated signal;
   an amplifier connected to said modulator for amplifying the modulated signal; and
   an output device connected to said amplifier for outputting the amplified modulated signal.

2. The device of claim 1, wherein the modulated signal is in the audible frequency range.

3. The device of claim 1, wherein the sensor array is a Hall sensor array.

4. The device of claim 1, wherein the sensor array is a magnetoresistive sensor array.

5. The device of claim 1, wherein said device is portable.

6. A portable device for reading information stored on a magnetic strip of a card, comprising:
   a card reader having activation means and a Hall sensor array positioned to be in alignment with the magnetic strip of the card when the card is properly placed within the reader, said activation means, responsive to proper placement of the card within the reader, activating the Hall sensor array for reading the information stored on the magnetic strip and outputting a read signal;
   a sound signal generator connected to said reader for generating a sound signal based upon the read signal; and
   a speaker connected to said sound signal generator for outputting the sound signal.

7. The device of claim 6, wherein the modulated signal is in the audible frequency range.

8. The device of claim 6, wherein said activation means includes a switch.

9. The device of claim 6, wherein said said activation means includes two contact pads for contacting a conductor bar on the card.

10. The device of claim 6, which said sound signal generator includes a modulator connected to said reader for modulating the read signal to obtain a modulated signal and an audio amplifier connected to said modulator for amplifying the modulated signal.

11. The device of claim 6, wherein said activation means deactivates, responsive to an absence of proper placement of the card within the reader, the Hall sensor array.

12. A portable device for reading information stored on a magnetic strip of a card and for converting the information to an audio signal, comprising:
   a Hall sensor array for reading the information stored on the magnetic strip and outputting a read signal;
   a sound signal generator connected to said array for generating a sound signal based upon the read signal, said sound signal generator including a modulator connected to said Hall sensor array for modulating the read signal as a modulated signal in an audible frequency range, and an audio amplifier connected to said modulator for amplifying the modulated signal; and
   a speaker connected to said sound signal generator for outputting the amplified modulated signal.

13. A device for reading information stored on a magnetic strip of a card and for converting the information to a smart card format, comprising:
   an array of Hall sensors;
   a current source associated with each of said Hall sensors;
   a delay line connected to each of said Hall sensors and to said current source, said delay line controlling said current source to sequentially activate each Hall sensor, each activated Hall sensor generating a signal in response to information stored on the magnetic strip of said card;
   an amplifier connected to said Hall sensor array for amplifying the generated signal;
   a logic circuit connected to said amplifier for converting the amplified signal into electronic pulses; and
   a contact connected to said logic circuit for receiving the electronic pulses.

14. The device of claim 13, further comprising a speaker connected to said amplifier for outputting the amplified signal.

15. The device of claim 13, wherein the delay line comprises a plurality of shift registers clocked to a common source.

16. The device of claim 1, wherein said amplifier is an audio amplifier and said output device is a speaker.

17. The device of claim 1, wherein said output device is an ultrasonic transducer.

18. The device of claim 13, further comprising current lead lines to the current source and voltage lead lines, said current lead lines being coated with a better conductor material than the voltage lead lines and lines connecting the Hall sensors, such that current flow in the Y-direction is enhanced and parasitic flow of current in the X-direction is reduced.

19. The device of claim 18, wherein resistance in the voltage lead lines and lines connecting the Hall sensors is on an order of 100 times resistance in the current lead lines so that current is guided through the Hall sensors from top to bottom.

* * * * *